(12) United States Patent
Watson et al.

(10) Patent No.: US 6,344,950 B1
(45) Date of Patent: Feb. 5, 2002

(54) HEAD DISK ASSEMBLY INCLUDING RAMP HAVING PIVOTING LOCATIONAL FEATURES

(75) Inventors: Scott E. Watson, San Jose; James M. Pausanos, Morgan Hill, both of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/406,254

(22) Filed: Sep. 27, 1999

(51) Int. Cl.[7] .............................................. G11B 21/22
(52) U.S. Cl. .................................................. 360/254.3
(58) Field of Search .......................... 360/254.7, 254.8, 360/254.9, 255; 300/254.3, 254.4, 254.5

(56) References Cited

U.S. PATENT DOCUMENTS 5,526,206 A * 6/1996 Shimizu ..................... 360/105
6,115,214 A * 9/2000 Allsup et al. ............... 360/105

* cited by examiner

Primary Examiner—David Davis
(74) Attorney, Agent, or Firm—W. Chris Kim; Milad G Shara

(57) ABSTRACT

A head disk assembly includes a disk, a head stack assembly and a ramp-defining structure. The disk has a recording surface surrounded by an outer circumference and the head stack assembly has an actuator pivot axis and a head gimbal assembly. The head gimbal assembly includes a gimbal defining a gimbal axis parallel to and spaced a first distance from the actuator pivot axis, and a lift tab having a lift-surface portion spaced a second, larger distance from the actuator pivot axis. The ramp-defining structure includes a wall extending parallel to the actuator pivot axis, an axis-defining portion defining a retraction pivot axis and a shelf projecting from the wall to define a bearing surface against which the lift-surface portion slides during unloading and loading operations. The bearing surface has a meandering and undulating shape to define a retention portion and a cam portion, the retention portion defining an arc relative to the retraction pivot axis, and the cam portion defining an arc elative to the actuator pivot axis. The ramp-defining structure is releasably secured relative to the disk such that in a secured condition the cam portion overlies the outer circumference and in an unsecured condition the cam portion can be moved to a position clear of the disk while the lift-surface portion slides on the retention portion.

8 Claims, 5 Drawing Sheets

HEAD DISK ASSEMBLY INCLUDING RAMP HAVING PIVOTING LOCATIONAL FEATURES

BACKGROUND OF THE INVENTION

1. Field of the Invention

The preset invention relates to disk drives. More particularly, the present invention relates to a disk drive head disk assembly that includes a ramp having pivoting locational features.

2. Description of the Prior Art

Ramp-loading disk drives utilize a ramp to transition a flying head off-of and back-onto a flying area above the surface of the rotating media. The ramp typically interacts with a feature of the gimbal assembly that supports the flying head. The media is spun-up while the gimbal assembly is supported by the ramp and the head is not in contact with the media. Once the media is rotating at a specified speed, the gimbal assembly and head are moved down the ramp such that an air bearing is developed head and the media. The gimbal assembly and head then move free of the ramp. Before the media is spun-down, the gimbal assembly is moved onto the ramp such that the head is moved away from the media.

The design of lower flying heads, tighter disk spacing in the disk stack and increased reliability requirements have lead to ramp designs that overhang the media in the radial direction. An overhanging ramp design, however, causes complications in the assembly of the drive. After disk (media) stack installation, the ramp cannot be loaded onto the disk drive baseplate with a simple vertical motion, which is the preferred high volume manufacturing method. Further, to minimize the disks' exposure to potential handling damage, it may be preferable to assemble the disk stack onto a spindle motor/baseplate assembly that already supports the head stack assembly and the Voice Coil Motor (VCM). In turn, this assembly sequence dictates that the overhanging ramp must be retracted (while still supporting the heads) during assembly to allow disk install. To prevent damage to the read/write heads during the retraction of the ramp, the retraction motion must be controlled in a repeatable and smooth manner. Additionally, for rework assembly, it is preferable to remove a disk or the disk stack without removing the head stack and VCM; or conversely, to remove the head stack and VCM without removal of the disk stack.

Existing ramps require both a vertical and horizontal motion during assembly. This design constrains the assembly sequence, such that the disk stack must be installed first, followed by installation of the ramp and the head stack, which must be installed last. Conventionally, if a disk must be replaced, both the head stack and the ramp must be removed first. Competitive pressures, however, have led the disk drive industry to strive to find ways to lower the cost of assembling disk drives. The structure of the head disk assembly has been targeted as a candidate for such cost cutting measures. What is needed, therefore, is a head disk assembly that eases the above-detailed constraints placed upon the disk drive assembly and rework processes. Such a head disk assembly should lower assembly and rework costs by not requiring both vertical and horizontal motions during assembly and/or rework and by allowing removal of the disk stack without first removing the ramp or the head stack.

SUMMARY OF THE INVENTION

Accordingly, this invention may be regarded as a head disk assembly, including a disk, a head stack assembly and a ramp-defining structure. The disk has a recording surface surrounded by an outer circumference and the head stack assembly has an actuator pivot axis and a head gimbal assembly. The head gimbal assembly includes a gimbal defining a gimbal axis parallel to and spaced a first distance from the actuator pivot axis, and a lift tab having a lift-surface portion spaced a second, larger distance from the actuator pivot axis. The ramp-defining structure includes a wall extending parallel to the actuator pivot axis, an axis-defining portion defining a retraction pivot axis and a shelf projecting from the wall to define a bearing surface against which the lift-surface portion slides during unloading and loading operations. The bearing surface has a meandering and undulating shape to define a retention portion and a cam portion. The retention portion defines an arc relative to the retraction pivot axis, and the cam portion defines an arc relative to the actuator pivot axis. The ramp-defining structure also includes means for releasably securing the ramp-defining structure relative to the disk such that in a secured condition the cam portion overlies the outer circumference and in an unsecured condition the cam portion can be moved to a position clear of the disk while the lift-surface portion slides on the retention portion.

According to further embodiments, a first end of the axis-defining portion may define a pair of facing keyed notches that forms a keyed gripping feature allowing a tool to grip and rotate the ramp-defining structure about the retraction pivot axis when the securing means is in the unsecured position. A second end of the axis-defining portion may define a chamfered lead in that facilitates accurate positioning of the ramp-defining structure relative to the lift-surface portion as the ramp-defining structure is assembled onto a disk drive baseplate. The ramp-defining structure may include a surface defining a through bore configured to receive the securing means, the through bore being aligned with a corresponding threaded bore in a disk drive baseplate when the ramp-defining structure is in an operational position in which the cam portion overlies the outer circumference.

The present invention may also be viewed as a head disk assembly, including a disk, a head gimbal assembly, a ramp-defining shelf and releasable securing means. The disk has a recording surface surrounded by an outer circumference. The head gimbal assembly is supported to swing relative to an actuator pivot axis and includes a gimbal defining a gimbal axis parallel to and spaced a first distance from the actuator pivot axis, and a lift tab having a lift-surface portion spaced a second, larger distance from the actuator pivot axis. The ramp-defining shelf is supported to swing relative to a retraction pivot axis, the shelf including a retention portion and a cam portion, the retention portion defining an arc relative to the retraction pivot axis, and the cam portion defining an arc relative to the actuator pivot axis. The releasable securing means secures the ramp-defining shelf relative to the disk such that in a secured condition the cam portion overlies the outer circumference and in an unsecured condition the cam portion can be moved to a position clear of the disk while the lift-surface portion slides on the retention portion.

The foregoing and other features of the invention are described in detail below and set forth in the appended claims.

DESCRIPTION OF THE PREFERRED EMBODIMENTS

Figure 1:
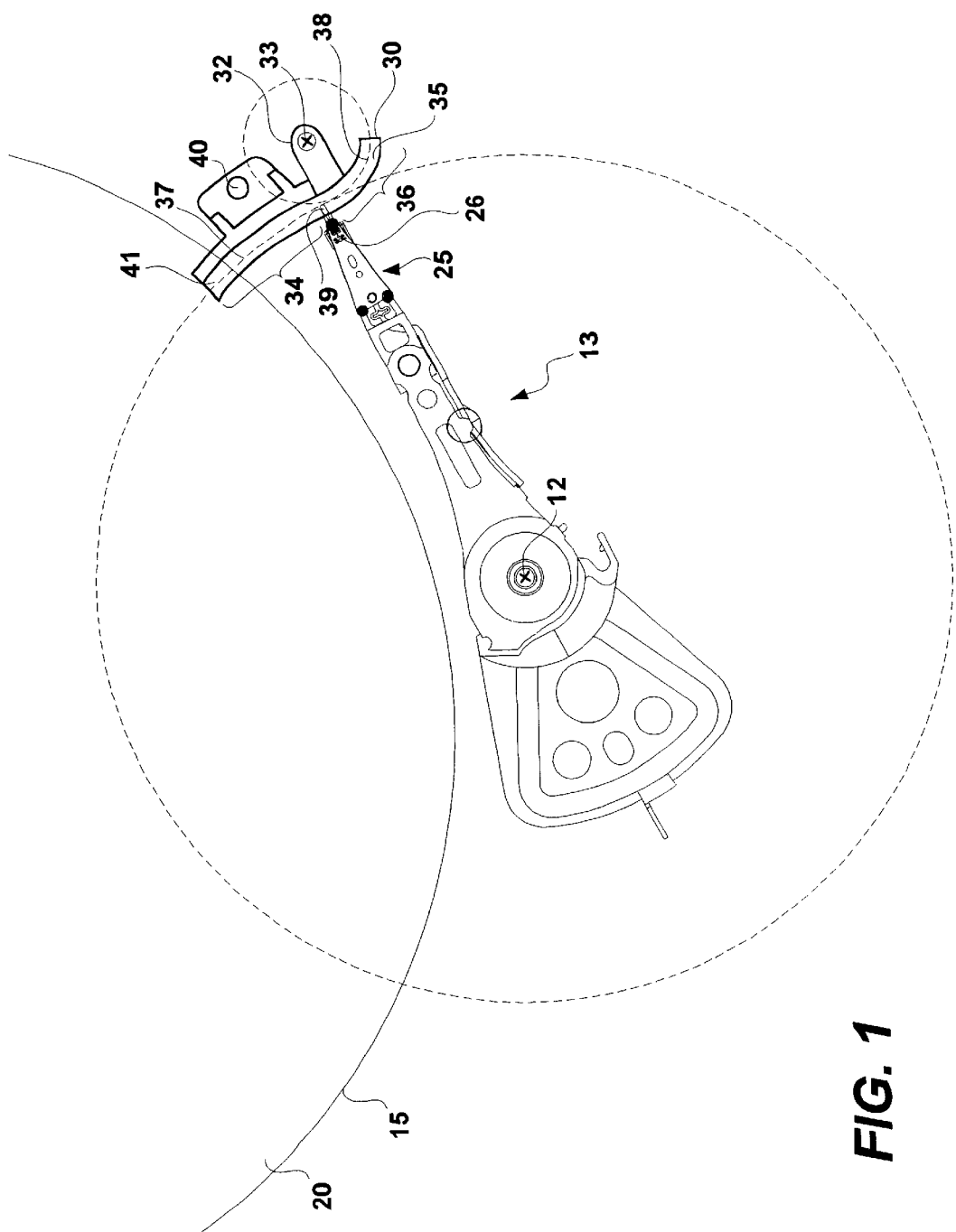
FIG. 1 is a plan view diagram of a head disk assembly according to an embodiment of the present invention.

FIG. 1 is a plan view diagram illustrating the structure of the head disk assembly according to an embodiment of the present invention. The head disk assembly of FIG. 1 includes a disk 15 having a recording surface 20 bounded by an outer circumference. In order to show sufficient detail, only a portion of the disk 15 is shown in FIG. 1. A Voice Coil Motor (VCM), not shown in FIG. 1, causes a head stack assembly (HSA) 13 to pivot about an actuator pivot axis 12 to cause the read write heads of the HSA 13 to sweep radially over the disk 15. The HSA 13 includes a head gimbal assembly (HGA) 25, which includes a gimbal defining a gimbal axis 26 parallel to and spaced a first distance from the actuator pivot axis 12. The gimbal axis 26 passes through the center of the heads of the HSA 13 and is perpendicular to the air bearing surface and the disk 15. The HGA 25 includes a lift tab having a lift-surface portion 39 spaced a second, larger distance from the actuator pivot axis 12. A structure 30 defines a ramp and includes a wall (such as wall 52 of FIG. 5) extending parallel to the actuator pivot axis 12, a shelf 35 and an axis-defining portion 32 defining a retraction pivot axis 33. The shelf 35 is supported to swing relative to the retraction pivot axis 33 and projects from the wall 52 (best seen in FIG. 5) to define a bearing surface 41 against which the lift-surface portion 39 slides during unloading and loading operations, as the lift-surface portion 39 slides off and back on the ramp defining structure 30, respectively. The bearing surface 41 has a shape that meanders in a first direction that is perpendicular to the actuator pivot axis 12 and the gimbal axis 26 (parallel to the plane of the paper on which FIG. 1 is represented) and that undulates in a second direction that is parallel to the actuator pivot axis 12 and the gimbal axis 26 (perpendicular to the plane of the paper on which FIG. 1 is represented). The meandering and undulating shape of the bearing surface 41 defines a retention portion 36 and a cam portion 34. As shown in FIG. 1, the retention portion 36 defines a first arc 38 relative to the retraction pivot axis 33, and the cam portion 34 defines a second arc 37 relative to the actuator pivot axis 12. That is, the retention portion 36 has a shape that generally follows the curvature of the arc 38, the arc 38 being centered on the retraction pivot axis 33 and extending generally to the cam portion 34 and the arc 37. Similarly, the cam portion 34 has a shape that generally follows the curvature of the arc 37, the arc 37 being centered on the actuator pivot axis 12 and extending generally to the retention portion 36 and the arc 38. Preferably, the first arc 38 and the second arc 37 are tangent to one another, as shown in FIG. 1.

The head disk assembly of FIG. 1 also includes means 40 for releasably securing the ramp-defining structure 30 relative to the disk 15 such that in a secured condition the ramp-defining structure 30 is in an operational position wherein the cam portion 34 overlies the outer circumference of the disk 15, which is the position of the ramp-defining structure 30 depicted in FIG. 1. In an unsecured condition, the cam portion 34 can be moved to a non-operational position that is clear of the disk 15 while the lift-surface portion 39 slides on the retention portion 36. The ramp-defining structure 30b shown in FIG. 3b is in such a position, wherein the securing means 40 has been released to an unsecured condition and wherein the cam portion 34 has been moved to a position that is clear of the disk 15 while maintaining the lift-surface portion 39 of the lift tab on the retention portion 36 of the bearing surface 41.

Figure 2:
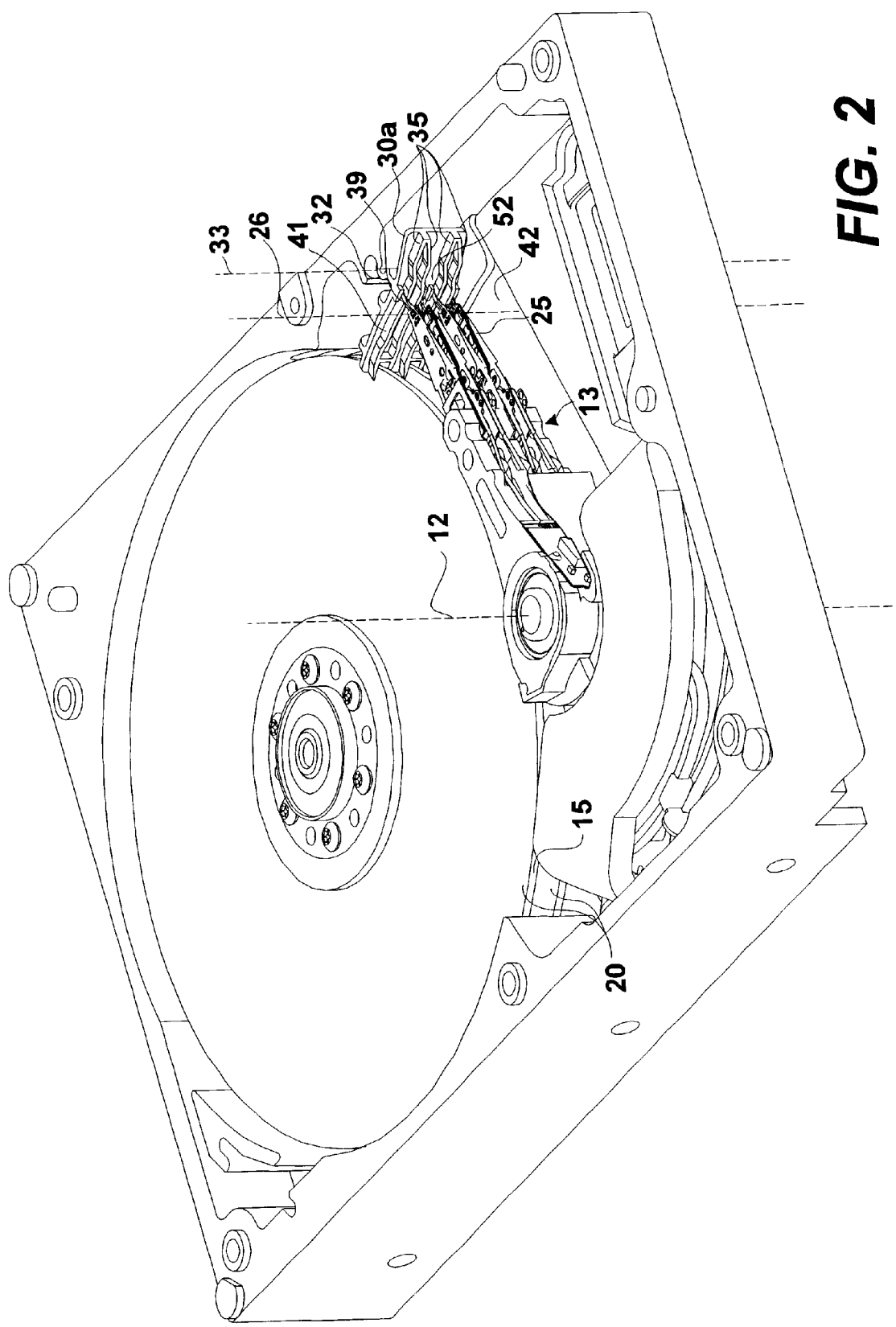
FIG. 2 is a perspective view of a disk drive incorporating the head disk assembly according to an embodiment of the present invention, wherein the ramp-defining structure is disposed in an operative and secured position.

FIG. 2 is a perspective view of a disk drive incorporating a head disk assembly according to an embodiment of the present invention. The disk drive of FIG. 2 is shown with the cover plate removed, so as to show the internal details of the head disk assembly, including a further embodiment of the ramp defining structure, show therein at reference 30a. The ramp-defining structure 30a of the head disk assembly is secured to the drive's baseplate 42 and is in an operative and secured position, in which the cam portion 34 overlies the outer circumference of the disk 15. The HSA 13 is configured to pivot about the actuator pivot axis 12, so as to cause the read-write heads to sweep radially across the disk 15. The gimbal axis 26 is parallel to and spaced a first distance from the actuator pivot axis 12, whereas the lift-surface portion 39 of the lift tab is spaced a second, larger distance from the actuator pivot axis 12. The axis-defining portion 32 of the ramp-defining structure 30a defines the retraction pivot axis 33. As shown in FIG. 2, the retraction pivot axis 33 may be disposed parallel to and spaced a third distance from the actuator pivot axis 12; the third distance being larger than the second distance of the gimbal axis 26 from the actuator pivot axis 12.

Figure 5:
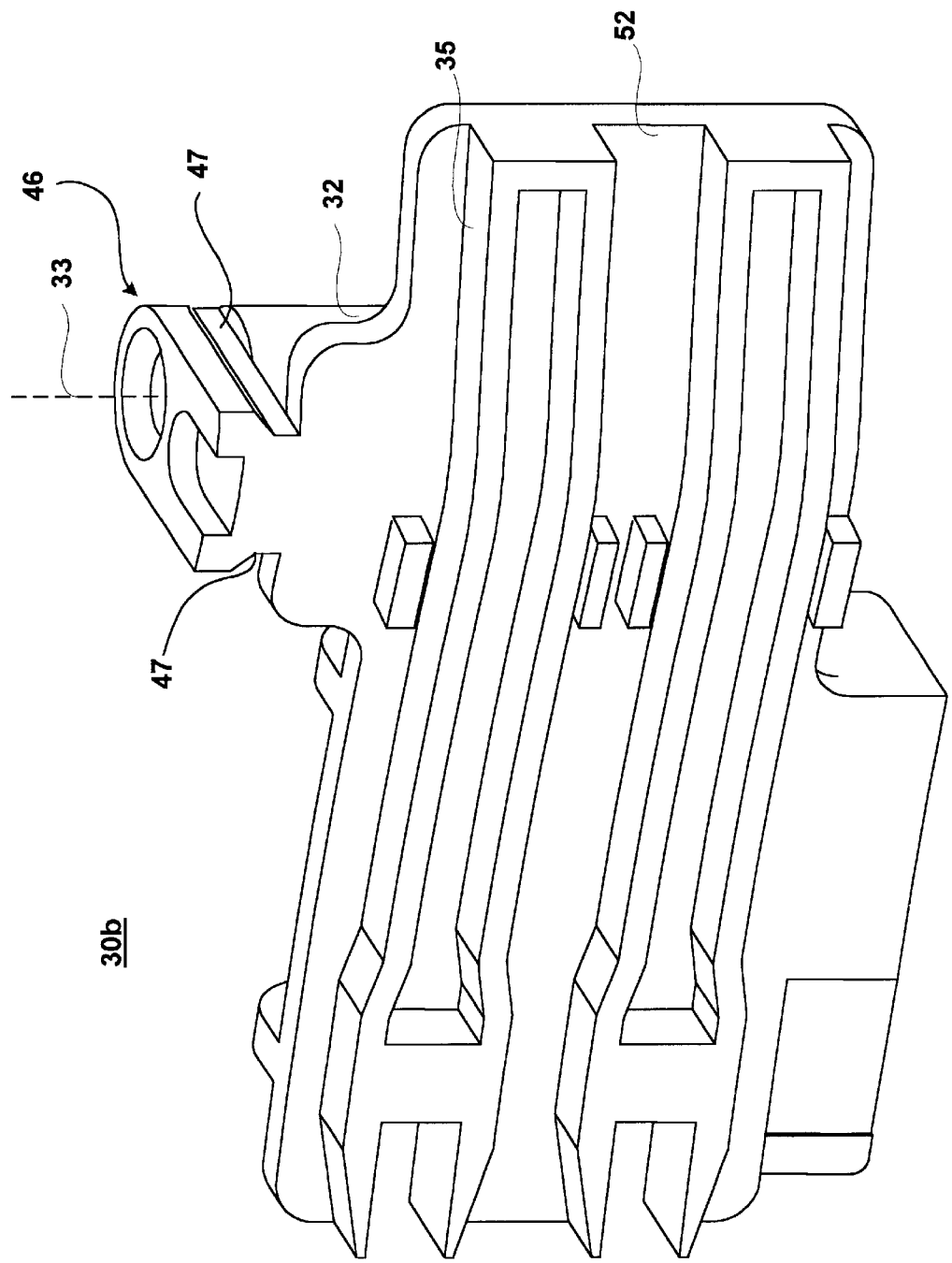
FIG. 5 is a perspective diagram of the ramp-defining structure of FIG. 1, enlarged to show additional detail.

As shown in FIGS. 2 and 5, the ramp-defining structure 30a, 30b includes a wall 52 that extends parallel to the actuator pivot axis 12. A shelf 35 extends from the wall 52 to define a bearing surface 41 against which the lift-surface portion 39 of the lift tab slides during unloading and loading operations. Four such shelves 35 are shown in the exemplary representation of FIGS. 2 and 5, a corresponding one of the lift-surface portions 39 sliding thereon during loading and unloading operations. The perspective representation of FIG. 2 also clearly shows the undulating shape of the bearing surface 41 defined by each of the shelves 35. Indeed, the bearing surfaces 41 defined by the shelves 35 vary in elevation (i.e., in a direction parallel to the actuator pivot axis 12) over their length (from the free extremity of the cam portion 34 to the free extremity of the retention portion 36, as best seen in FIG. 1). The meandering shape of the bearing surface 41 is plainly visible in the plan view of FIG. 1.

Figure 3A:
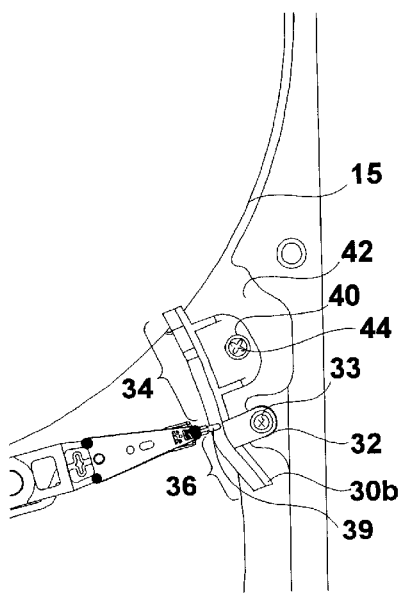
FIG. 3a is a detail plan view of disk drive of FIG. 2a, wherein the ramp-defining structure is secured to the disk drive baseplate in the operative and secured position.
Figure 3B:
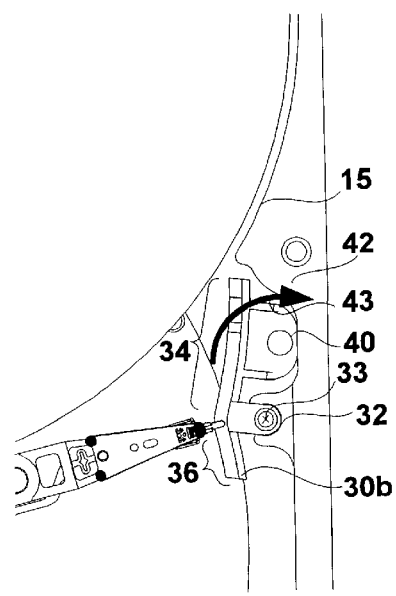
FIG. 3b shows the detail plan view of the disk drive of FIG. 2a, wherein the ramp-defining structure is pivoted to in a non-operative position.

FIGS. 3a and 3b depict a detail plan view, wherein another embodiment of the ramp-defining structure, shown at reference 30b, is mated to the disk drive baseplate 42 in the operative and secured condition and in the non-operative and unsecured condition, respectively. As shown in FIG. 3a, the cam portion 34 overlies the outer circumference of the disk 15. The ramp-defining structure 30b of FIG. 3a is in a secured condition, wherein the securing means 40 secures the ramp-defining structure 30b to the baseplate 42 of the drive. For example, the securing means 40 may include a screw 44 to secure the ramp-defining structure 30b to the baseplate 42. When the ramp-defining structure 30b is in the secured condition (in which the lift-surface portion 39 is allowed to slide during unloading and loading operations), the screw 44 secures the ramp-defining structure 30b onto the baseplate 42.

In contrast, when the securing means 40 is released and in the unsecured condition (meaning that the screw 44 or other functionally similar securing means is released or removed, for example), the ramp-defining structure 30b may be caused to pivot in the direction indicated by the arrow referenced by numeral 43; that is, about the retraction pivot axis 33 defined by the axis defining portion 32. In this position, the cam portion 34 no longer overlies the circumference of the disk 15 and may be moved to a position clear of the disk 15 while the life-surface portion 39 slides on the retention portion 36. The topology of the bearing surface 41 that interfaces with the lift-surface portion 39 is such that the ramp-defining structure 30b may be rotated about the retraction axis 11 while supporting the lift-surface portion 39 of the lift tab and clearing all other features of the HSA 13. Advantageously, a HGA having stiffened lift tabs may be utilized in conjunction with the present invention, although other lift tab configurations may also be implemented. An example of such an advantageous HGA is disclosed in commonly assigned U.S. patent application Ser. No. 09/223, 489 filed on Dec. 30, 1998 (assignee docket K35A0461) and entitled "Water Slide Suspension Assembly having Stiffened Vertically Offset Lift Tab", the disclosure of which is incorporated herewith in its entirety.

Figure 4:
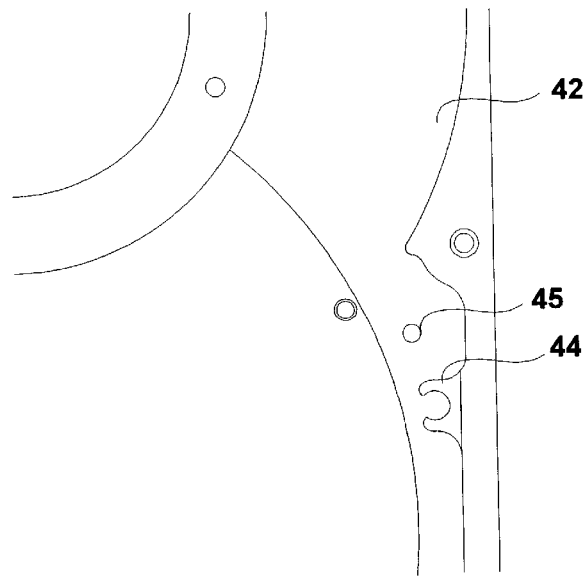
FIG. 4 is a detail plan view of the disk drive baseplate, showing the structure thereof configured to receive, secure and guide the pivoting motion of the ramp-defining structure according to the present invention.

FIG. 4 is a detail plan view of the disk drive baseplate 42, showing the structure thereof configured to receive and secure the ramp-defining structure 30b according to the present invention. The axis-defining portion 32 of the ramp-defining structure 30b preferably fits into a close tolerance alignment arc 44 formed in the drive's baseplate 42, which alignment arc 44 accurately locates the position of the ramp-defining structure 30b relative to the HSA 13, and thus to the lift-surface portion 39. The axis-defining portion 32, therefore, controls the pivoting movement of the ramp-defining structure 30b by bearing against the alignment arc 44. The tighter the clearance between the axis-defining portion 32 and the alignment arc 44 and the greater the cylindrical bearing length of the axis-defining portion 32, the better controlled the motion of the ramp-defining structure 30b will be. The baseplate 42, as shown in FIG. 4, also includes a threaded hole 45 that is aligned with the securing means 40 when the ramp-defining means 30b is in the secured, operational condition. The threaded hole 45 is configured to receive the screw 44, or any other releasable securing means used to secure the ramp-defining structure 30b to the baseplate 42.

Figure 6:
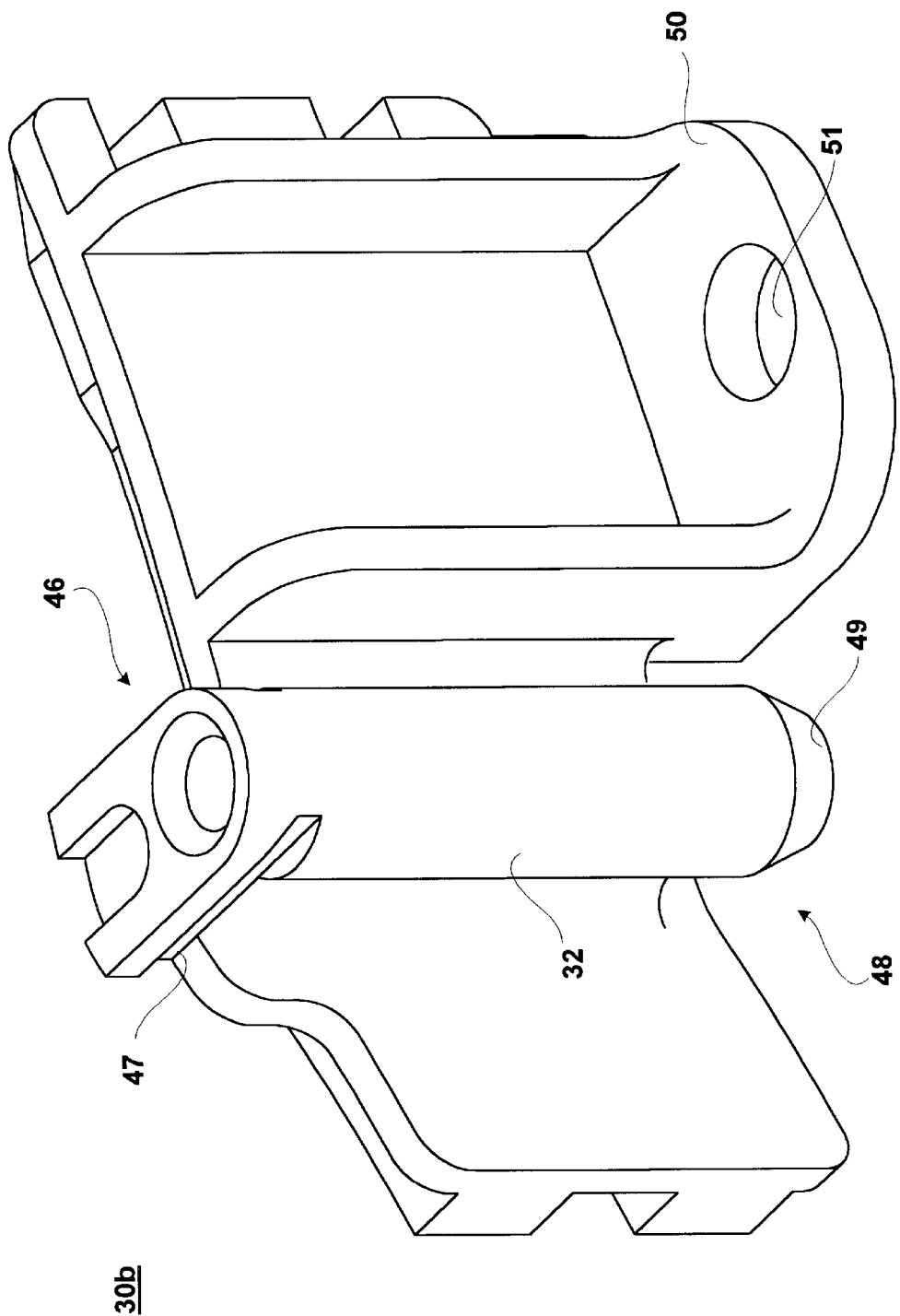
FIG. 6 shows another perspective view of the ramp-defining structure of FIG. 5, illustrating the structure thereof allowing precise positioning and guiding of the ramp-defining structure relative to the disk drive baseplate.

FIG. 5 is a perspective diagram of the ramp-defining structure 30b, enlarged to show additional detail. FIG. 6 is another perspective view of the ramp-defining structure 30b of FIG. 5, showing the structure allowing precise positioning thereof onto the baseplate 42 of the disk drive. Considering now FIGS. 5 and 6 collectively, a first end 46 (best seen in FIG. 5) of the axis-defining portion 32 defines a pair of facing keyed notches 47, which form a keyed gripping feature allowing a tool (such as an automated assembly tool, not shown) to grip and rotate the ramp-defining structure 30b about the retraction pivot axis 33 when the securing means 40 is in the unsecured condition. A second end 48 (best seen in FIG. 6) of the axis-defining portion 32 defines a chamfered lead in 49, which facilitates accurate positioning of the ramp-defining structure 30b relative to the lift-surface portion 39, as the ramp-defining structure 30b is assembled onto the disk drive baseplate 42. As shown in FIG. 6, the ramp-defining structure 30b includes a surface 50 defining a through bore 51 configured to receive the securing means 40, the through bore 51 being aligned with the corresponding threaded hole 45 in the disk drive baseplate 42 when the ramp-defining structure 30b is in the operational position in which the cam portion 34 overlies the outer circumference of the disk 15.

Preferably, the structure of the head disk assembly of FIG. 1 is such that when the ramp-defining structure 30 (or 30a or 30b) is rotated away from the disk 15 (in the unsecured, non-operational condition shown in FIG. 3b), ample clearance is provided for the disk 15 to be installed in a vertical-only motion, as opposed to the vertical and horizontal motions previously required to mount the disk 15, all the while supporting the lift-surface portion 39 of the HGA 25 on the bearing surface 41. Conversely, the ramp-defining structure 30 (or 30a or 30b) could be installed in the unsecured, non-operation condition shown in FIG. 3b after the disk 15 has been installed. After installation of the disk 15, the ramp-defining structure 30 (or 30a or 30b) may be rotated about the retraction axis 33 to the secured, operational condition illustrated in FIGS. 1, 2 and 3a, whereupon the screw 44 or other functionally effective releasable securing means may be threaded into the threaded hole 45 through the through bore 51 of the ramp-defining structure 30 (or 30a or 30b).

Suitably, the ramp-defining structure 30 (or 30a or 30b) can be loaded onto the disk drive baseplate 42 with a simple vertical motion, which is the preferred high volume manufacturing method. Furthermore, the disk stack can be assembled onto a spindle motor/baseplate assembly that already supports the HSA 13 and the VCM, which assembly sequence dictates that the ramp-defining structure 30 (or 30a or 30b) be retracted (while still supporting the heads) in the non-operational and unsecured condition during assembly to allow disk install. The structure of the head disk assembly of FIG. 1 prevents damage to the read/write heads during the retraction of the ramp-defining structure 30 (or 30a or 30b) in the unsecured and non-operational load condition and allows this retraction motion to be controlled in a repeatable and smooth manner. The structure of the head disk assembly also allows the disk 15 to be removed without removing the HSA 13 and VCM; or conversely, allows the HSA 13 and VCM to be removed without removal of the disk 15, such as might be necessary during rework assembly, for example.

We claim:

1. A head disk assembly, comprising:
   a disk having a recording surface surrounded by an outer circumference;
   a head stack assembly having an actuator pivot axis and including a head gimbal assembly;
   the head gimbal assembly including a gimbal defining a gimbal axis parallel to and spaced a first distance from the actuator pivot axis, and including a lift tab having a lift-surface portion spaced a second, larger distance from the actuator pivot axis;
   a ramp-defining structure including:
      a wall extending parallel to the actuator pivot axis;
      an axis-defining portion defining a retraction pivot axis;
      a shelf projecting from the wall to define a bearing surface against which the lift-surface portion slides during unloading and loading operations;

the bearing surface having a meandering and undulating shape to define a retention portion and a cam portion;

the retention portion defining a first arc that is centered about the retraction pivot axis, and the cam portion defining a second arc that is centered about the actuator pivot axis;

means for releasably securing the ramp-defining structure relative to the disk such that in a secured condition the cam portion overlies the outer circumference and in an unsecured condition the cam portion can be moved to a position clear of the disk while the lift-surface portion slides on the retention portion.

2. The head disk assembly of claim 1, wherein a first end of the axis-defining portion defines a pair of facing keyed notches, the pair of keyed notches forming a keyed gripping feature allowing a tool to grip and rotate the ramp-defining structure about the retraction pivot axis when the securing means is in the unsecured position.

3. The head disk assembly of claim 2, wherein a second end of the axis-defining portion defines a chamfered lead in, the chamfered lead in facilitating accurate positioning of the ramp-defining structure relative to the lift-surface portion as the ramp-defining structure is assembled onto a disk drive baseplate.

4. The head disk assembly of claim 1, wherein the ramp-defining structure includes a surface defining a through bore that is configured to receive the securing means, the through bore being aligned with a corresponding threaded bore in a disk drive baseplate when the ramp-defining structure is in an operational position in which the cam portion overlies the outer circumference.

5. A head disk assembly, comprising:

a disk having a recording surface surrounded by an outer circumference;

a head gimbal assembly that is supported to swing relative to an actuator pivot axis;

the head gimbal assembly including a gimbal defining a gimbal axis parallel to and spaced a first distance from the actuator pivot axis, and including a lift tab having a lift-surface portion spaced a second, larger distance from the actuator pivot axis;

a ramp-defining shelf that is supported to swing relative to a retraction pivot axis, the shelf including a retention portion and a cam portion; the retention portion defining a first arc that is centered about the retraction pivot axis, and the cam portion defining a second arc that is centered about the actuator pivot axis;

means for releasably securing the ramp-defining shelf relative to the disk such that in a secured condition the cam portion overlies the outer circumference and in an unsecured condition the cam portion can be moved to a position clear of the disk while the lift-surface portion slides on the retention portion.

6. The head disk assembly of claim 5, wherein a first end of the axis-defining portion defines a pair of facing keyed notches, the pair of keyed notches forming a keyed gripping shelf allowing a tool to grip and rotate the ramp-defining structure about the retraction pivot axis when the securing means is in the unsecured position.

7. The head disk assembly of claim 6, wherein a second end of the axis-defining portion defines a chamfered lead in, the chamfered lead in facilitating accurate positioning of the ramp-defining shelf relative to the lift-surface portion as the ramp-defining structure is assembled onto a disk drive baseplate.

8. The head disk assembly of claim 5, wherein the securing means includes a surface defining a through bore that is configured to receive the securing means, the through bore being aligned with a corresponding threaded bore in a disk drive baseplate when the ramp-defining structure is in an operational position in which the cam portion overlies the outer circumference.

* * * * *